US011665168B2

(12) United States Patent
Hodge

(10) Patent No.: US 11,665,168 B2
(45) Date of Patent: May 30, 2023

(54) WIRELESS SYSTEM UTILIZING GENERIC WIRELESS DEVICES IN A CONTROLLED ENVIRONMENT

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 407 days.

(21) Appl. No.: 16/860,457

(22) Filed: Apr. 28, 2020

(65) Prior Publication Data

US 2020/0260280 A1 Aug. 13, 2020

Related U.S. Application Data

(63) Continuation of application No. 16/148,676, filed on Oct. 1, 2018, now Pat. No. 10,638,322, which is a continuation of application No. 15/591,969, filed on May 10, 2017, now Pat. No. 10,091,656.

(51) Int. Cl.
*H04L 9/40* (2022.01)
*H04W 12/06* (2021.01)
*H04W 12/08* (2021.01)
*H04W 12/086* (2021.01)
*H04L 67/306* (2022.01)
*H04L 67/12* (2022.01)
*H04L 67/141* (2022.01)

(52) U.S. Cl.
CPC .......... *H04L 63/101* (2013.01); *H04L 63/102* (2013.01); *H04W 12/06* (2013.01); *H04W 12/068* (2021.01); *H04W 12/08* (2013.01); *H04W 12/086* (2021.01); *H04L 67/12* (2013.01); *H04L 67/141* (2013.01); *H04L 67/306* (2013.01)

(58) Field of Classification Search
CPC .. H04L 63/101; H04L 63/102; H04W 12/068; H04W 12/086; H04W 12/06
See application file for complete search history.

(56) References Cited

U.S. PATENT DOCUMENTS

| 6,665,380 B1 | 12/2003 | Cree et al. |
| 8,695,060 B2 | 4/2014 | Wade et al. |
| 10,091,656 B1 | 10/2018 | Hodge |

(Continued)

OTHER PUBLICATIONS

Vassilis Prevelakis et al., Sandboxing Applications, USENIX (Year: 2001).*

*Primary Examiner* — Shanto Abedin
(74) *Attorney, Agent, or Firm* — Sterne, Kessler, Goldstein & Fox P.L.L.C.

(57) ABSTRACT

A generic wireless device management system and a method for operating the management system in a controlled environment is disclosed. The enterprise management system includes a generic wireless device and a generic provisioning server. The generic wireless device, which is initially in a generic blank state, coordinates with the generic provisioning server to authenticate an inmate and to load an inmate profile. After loading the inmate profile, the generic wireless device provides access to content specific to the inmate. After the inmate signs out of the generic wireless device, the generic wireless device is returned to a generic blank state.

15 Claims, 8 Drawing Sheets

(56) References Cited

U.S. PATENT DOCUMENTS

| | | | |
|---|---|---|---|
| 2005/0114881 A1* | 5/2005 | Philyaw | H04L 67/535 |
| | | | 725/112 |
| 2010/0024036 A1 | 1/2010 | Morozov et al. | |
| 2010/0235750 A1* | 9/2010 | Noland | H04L 41/22 |
| | | | 709/221 |
| 2013/0091543 A1* | 4/2013 | Wade | G06F 21/53 |
| | | | 726/1 |
| 2014/0059642 A1* | 2/2014 | Deasy | G06F 9/54 |
| | | | 726/1 |
| 2014/0267547 A1* | 9/2014 | Torgersrud | H04W 12/08 |
| | | | 348/14.02 |
| 2014/0280559 A1 | 9/2014 | Torgersrud | |
| 2016/0087955 A1* | 3/2016 | Mohamad Abdul | |
| | | | H04L 63/0823 |
| | | | 726/7 |
| 2016/0173685 A1* | 6/2016 | Lobo | H04L 67/306 |
| | | | 455/415 |
| 2016/0314299 A1* | 10/2016 | Almer | G06F 21/6218 |
| 2017/0147795 A1* | 5/2017 | Sardesai | G06F 21/41 |
| 2018/0260926 A1 | 9/2018 | Bambocci et al. | |
| 2019/0174315 A1 | 6/2019 | Hodge | |

\* cited by examiner

WIRELESS SYSTEM UTILIZING GENERIC WIRELESS DEVICES IN A CONTROLLED ENVIRONMENT

CROSS REFERENCE TO RELATED APPLICATIONS

This application is a continuation of U.S. Nonprovisional patent application Ser. No. 16/148,676, filed Oct. 1, 2018, titled "Wireless System Utilizing Generic Wireless Devices in a Controlled Environment," issued as U.S. Pat. No. 10,638,322, which is a divisional of U.S. Nonprovisional patent application Ser. No. 15/591,969, filed May 10, 2017, titled "Wireless System Utilizing Generic Wireless Devices in a Controlled Environment," issued as U.S. Pat. No. 10,091,656, the contents of which are hereby incorporated herein by reference in its entirety.

BACKGROUND

Field

This disclosure relates to a wireless system that utilizes generic wireless devices within a controlled environment.

Background

Use of wireless devices within a controlled environment, such as a correctional facility or prison, has become increasingly prevalent. Security demands within the controlled environment require managing the wireless devices as well as managing the content associated with the inmates. As the number and types of wireless devices within a controlled environment increase, the management of those wireless devices and associated inmate content becomes increasingly complex and expensive.

Typically, each wireless device is assigned to specific inmate of the controlled environment. Accordingly, wireless devices in a controlled environment are becoming increasingly difficult to manage. The proliferation of both the number and types of wireless devices and the fractured ownership of files on the wireless devices stress the controlled environment's ability to control and track usage of all wireless devices and executed files within its walls. Prior art methods are currently not equipped to efficiently manage these devices and files which increases the possibility that the wireless devices can be compromised and improperly used.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
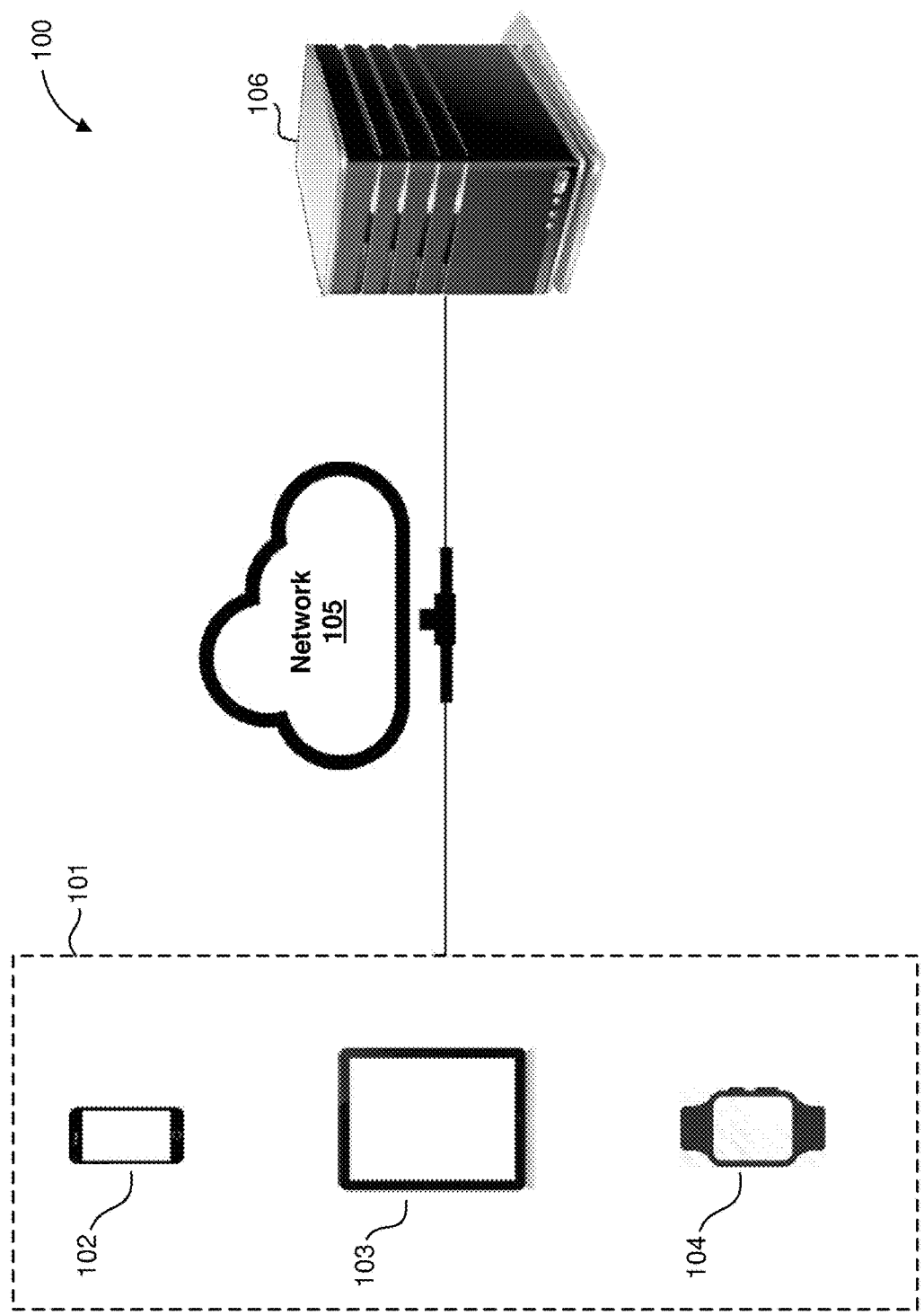
FIG. 1 illustrates a block diagram of an exemplary generic wireless device management system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Generic Wireless Device Management System

FIG. 1 illustrates a block diagram of an exemplary generic wireless device management system 100, according to embodiments of the present disclosure. Generic wireless device management system 100 can be implemented in a controlled environment 101, such as a prison. Generic wireless device management system 100 provides management of generic wireless devices, such as a generic smartphone 102, a generic tablet 103, and a generic wearable device 104. A controlled environment can distribute generic wireless devices to its inmates. In some embodiments, prior to sign-in by an inmate, generic wireless devices do contain any content (e.g., movies, music, applications) or profile information (e.g., personal address lists, white list, black lists, restrictions, access rules) associated with an inmate. In some embodiments, content refers to In other words, generic wireless devices are essentially blank slates that are later populated with inmate profile information and content from a generic provisioning server 106 after authenticating an inmate's use of the generic wireless device. After the inmate signs out (e.g., logs out of his account or turns off the generic wireless device), the inmate's profile information and content are erased from the generic wireless device turning the generic wireless device to its original "generic" state. Such an implementation allows controlled environment 101 to deploy the same generic wireless devices to inmates throughout its wireless system which allows all generic wireless devices to be interchangeable with each other reducing costs for controlled environment 101.

In some embodiments, generic wireless device management system 100 includes controlled environment 101 which can include one or more generic wireless devices and a generic provisioning server 106. In some embodiments, one or more generic wireless devices can include generic smartphone 102, generic tablet 103, and generic wearable device 104. In some embodiments, there are a plurality of generic smartphones, a plurality of generic tablets, and a plurality of wearable devices deployed within controlled environment 101. Other variations, such as a different number or different types of wireless devices, are within the scope of the invention.

In some embodiments, generic wireless device management system 100 further includes a network 105 that connects one or more generic wireless devices to generic provisioning server 106. In some embodiments, generic provisioning server 106 is co-located with controlled environment 101. In some embodiments, generic provisioning server 106 may be located remotely from controlled environment 101. Network 105 may include any or all of a Local-Area Network (LAN), a Wide-Area Network (WAN), or the Internet, depending on the location of generic provisioning server 106 in relation to controlled environment 101. For example, network 105 is implemented as a LAN when generic provisioning server 106 is co-located with controlled environment 101. In another example, network 105 is implemented as a WAN or the Internet when generic provisioning server 106 is located at remotely from controlled environment 101. In some embodiments, generic provisioning server 106 is cloud-based and includes one or more cloud-based servers. In some embodiments, generic provisioning server 106 is a server within a data center that supports the wireless devices within controlled environment 101.

In some embodiments, one or more generic wireless devices are "dumb" terminals that act as conduits providing access to inmate profile information and content stored in generic provisioning server 106. Inmate profile and information and content can be loaded as needed (e.g., upon inmate request) from generic provisioning server 106 over network 105 to one or more generic wireless devices. To further reduce costs, one or more generic wireless devices can be implemented with limited storage and/or limited processing capability. In other words, storage and/or processing capabilities can be offloaded from one or more generic wireless devices to generic provisioning server 106.

In some embodiments, generic provisioning server 106 is responsible for provisioning (e.g., by streaming, pushing, preprocessing) content and data to one or more generic wireless devices. Generic provisioning server 106 can provision the content and data based on a request from one or more generic wireless devices. For example, after an inmate signs in and is determined to be authorized to use a generic wireless device, the generic wireless device submits a request to generic provisioning server for content and/or data associated with the authorized inmate. Generic provisioning server 106 can also provision the content and data based on a predetermined schedule established by administrators of controlled environment 101. For example, As will be discussed in additional detail below, content and/or data provisioned by generic provisioning server 106 are loaded into temporary workspaces called a generic space. After a certain condition, the content and/or data is automatically erased from the generic wireless device. These conditions can include but are not limited to when the inmate logs off from the generic wireless device, when the generic wireless device powers off, and a predetermined time period has elapsed since the inmate has logged into the generic wireless device.

In some embodiments, one or more generic wireless devices can connect to network 105 through wireless connections, such as Bluetooth™ or IEEE 802.11 (commonly known as Wi-Fi). One or more generic wireless devices can connect to network 105 through one or more access points (not shown) that are installed in specific areas of controlled environment 101 and can provide network access between generic wireless devices and generic provisioning server 106. The access point can be implemented as any device that provides network access such as, but not limited to, a router, a modem, smartphone, a tablet, or a laptop device.

Exemplary Wireless Device

Figure 2:
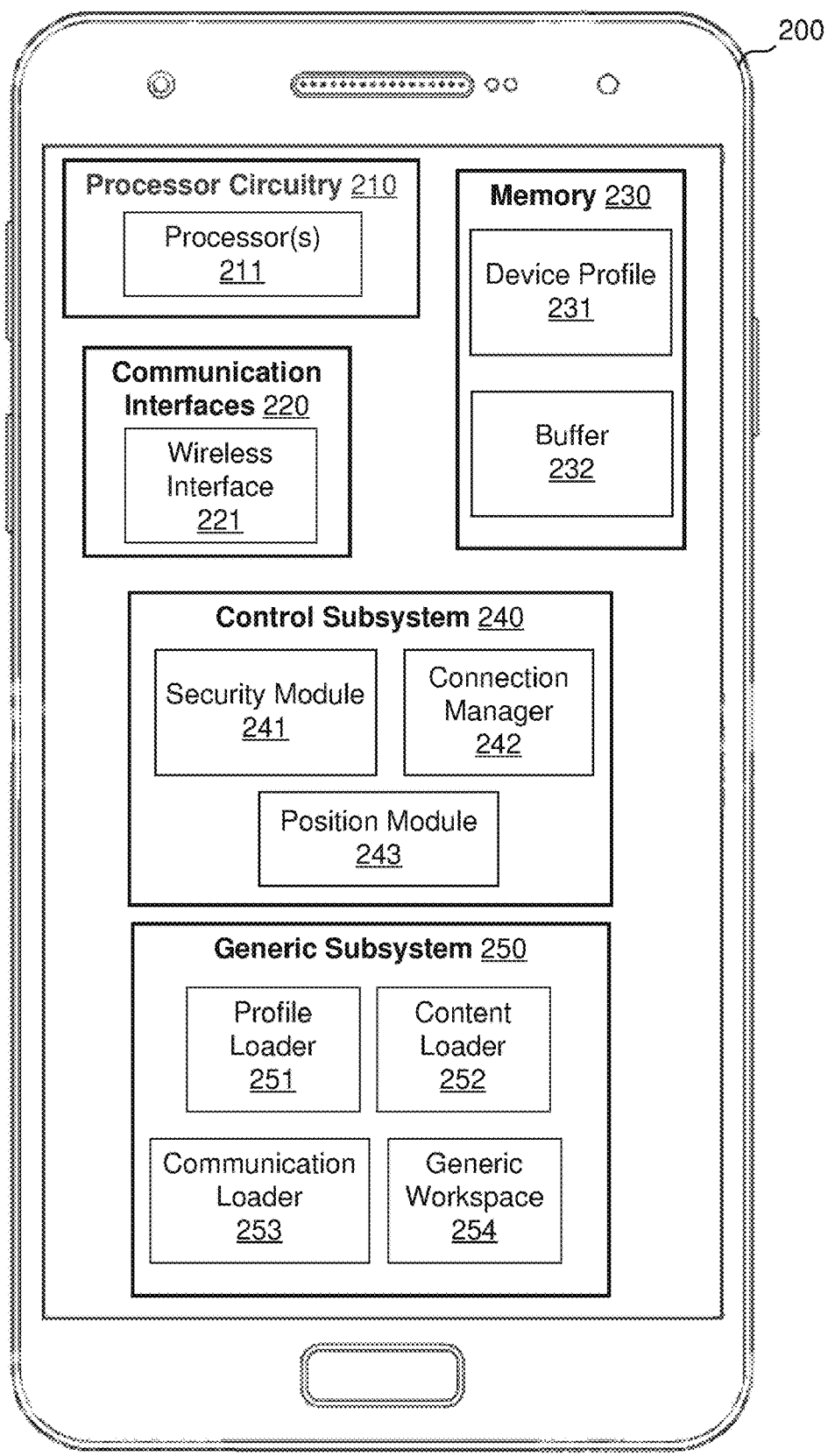
FIG. 2 illustrates a block diagram of an exemplary generic wireless device for use in the exemplary generic wireless device management system of FIG. 1, according to embodiments of the present disclosure.

FIG. 2 illustrates a block diagram of an exemplary generic wireless device 200 for use in the exemplary generic wireless device management system 100 of FIG. 1, according to embodiments of the present disclosure. Generic wireless device 200 represents an exemplary embodiment of generic smartphone 102, generic tablet 103, and generic wearable device 104 as described in FIG. 1. In some embodiments, generic wireless device 200 includes processor circuitry 210, communication interfaces 220, memory 230, control subsystem 240, and generic subsystem 250.

Processor circuitry 210 includes one or more processors 211. The number of processors 211 can be scaled to match the number of simultaneous user connections desired to be supported by an generic wireless device management system such as generic wireless device management system 100 of FIG. 1. Processors 211 of processor circuitry 210 control the operation of generic wireless device 200 and its components including communication interfaces 220, memory 230, control subsystem 240, and generic subsystem 250.

Communication interfaces 220 include one or more transceivers, transmitters, and/or receivers that communicate via a wireless interface 221, such as through one or more antennas. For example, communication interfaces 220 includes a component, such as a Bluetooth transceiver, that enables Bluetooth communication between generic wireless device 200 and an external device that also has Bluetooth capability, such as a smartphone, a tablet, a wireless headset, and/or wireless earbuds. In an embodiment, communication interfaces 220 are configured to transmit and receive communications between generic wireless device 200 and generic provisioning server 106 via network 105. In an embodiment, communication interfaces 220 connect generic wireless device 200 with other devices such as a mobile device, a kiosk, an access point, a beacon, and/or external input devices such as a keyboard, mouse, camera, or touch interface.

In some embodiments, memory 230 can be any well-known volatile and/or non-volatile memory that is removable and/or non-removable. Memory 230 can store device profile 231 which includes information regarding generic wireless device 200. For example, device profile 231 can include any of network addresses, settings, and global rules all of which can be provided, controlled, and managed by administrators of controlled environment 101. Memory 230 can also include buffer 232 which is a temporary memory space into which data can be loaded for an authenticated user of generic wireless device 200. As will be discussed with respect to profile loader 251, buffer 232 temporarily stores information and content as specified by a profile associated with an authenticated user of generic wireless device 200. Buffer 232 can store streaming content from a database, such as generic provisioning server 106 and content that is automatically provided by generic provisioning server 106 upon the inmate signing into generic wireless device 200.

In some embodiments, buffer 232 can further impose temporal limitations on any information stored therein. For example, buffer 232 can be programmed to erase all information after a certain condition is met. Conditions can include but are not limited to a timeout condition after a predetermined period of time, when the inmate logs off from generic wireless device 200, and when the generic wireless device 200 is turned off.

In some embodiments, control subsystem 240 can include security module 241, connection manager 242, and position module 243. Security module 241 coordinates security of generic wireless device 200 by authenticating users and by communicating with generic provisioning server 106. Security module 241 can authenticate users of generic wireless device 200 utilizing identity data of inmates. Identity data includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Security module 241 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

At the start of the inmate's session with generic wireless device 200, security module 241 records the inmate that has signed in. During the inmate's session, security module 241 continues monitoring a user of generic wireless device 200 to ensure that the inmate that started the session has not handed generic wireless device 200 to another inmate in an effort to circumvent the authentication protocols of generic wireless device 200. Security module 241 may monitor the user of generic wireless device 200 on a continuous or intermittent (e.g., sampling) basis. Monitoring the user includes detecting identity information of the user such as biometric information and radio frequency identification (RFID) information In some embodiments, security module 241 includes circuitry for receiving biometric information from a user of generic wireless device 200. Monitoring the user can include monitoring biometric information (e.g., voice information, retinal information, facial information) of the user. For example, security module 200 may continuously or intermittently compare biometric information received during the session, such as the user's voice, the user's eye information, and the user's facial information with the biometric information of the user that initially started the session. In some embodiments, controlled environment 101 provides a RFID tag that transmits a signal identifying the inmate within controlled environment 101. Monitoring the user can further include monitoring the RFID signals to confirm the identity of the user throughout the session of generic wireless device 200. For example, security module 200 may continuously or intermittently compare the identity associated with an RFID signal received during the session with the identity associated with an RFID signal that initially started the session.

When the comparison detects a discrepancy between the identities of the users, security module 241 determines a violation of the usage of wireless generic device 200. When there is a violation, security module 241 can shut off wireless generic device 200, sign off the user, and/or transmit a message to a monitoring center to indicate the violation of usage. Transmitting a message to the monitoring center can include the identity information of the user that initiated the session on wireless generic device 200 and the identity information of the second user that was detected during the session on wireless generic device 200.

Security module 241 also secures generic wireless device 200 from unauthorized modification or access to settings of generic wireless device 200. For example, security module 241 prevents inmates from changing settings related to network connections, the display, and applications installed on generic wireless device 200.

In some embodiments, security module 241 can also encrypt and decrypt communications to and from generic wireless device 200. Communications include but are not limited to voice data, video data, text data (e.g., short messaging service (SMS) messages, emails), and Internet data. Security module 241 communicates with a server, such as generic provisioning server 106, and encrypts and decrypts communications with the server.

In some embodiments, connection manager 242 can control and manage connections between generic wireless device 200 and generic provisioning server 106. For example, connection manager 242 can establish connections between generic wireless device 200 and generic provisioning server 106 and provide statistics regarding connections to generic provisioning server 106. Statistics can be utilized by administrators of controlled environment 101 to monitor usage of generic wireless device 200.

Position module 243 provides location functionality that allows generic wireless device 200 to provide location-related information to generic provisioning server 106. In some embodiments, position module 243 includes GPS circuitry. Position module can provide location information, such as GPS coordinates, to generic provisioning server 106. Generic provisioning server may then utilize the GPS coordinates to determine the location of generic wireless device 200 within the controlled environment. Position module 243 may also include indoor positioning systems (IPS) technology, accelerometers, and/or gyroscopes to determine position and motion of generic wireless device 200.

In some embodiments, generic subsystem 250 includes profile loader 251, content loader 252, communication loader 253, and generic workspace 254. Profile loader 251 customizes generic wireless device 200 upon authentication of a user by loading the user's profile, such as an inmate profile, into generic wireless device 200. For example, when an inmate signs into generic wireless device 200, profile loader 251 retrieves the inmate's profile based on their sign-in information. The inmate profile can be stored in a central database, such as in generic provisioning server 106.

In some embodiments, the inmate profile can include information regarding content associated with the inmate, administrative rules governing privileges (e.g., rules that control a user's usage of generic wireless device 200 and/or content), and settings associated with generic wireless device 200 but specific to the inmate. Content includes applications and media such as photos, music, and movies. The inmate profile determines the content that is to be loaded onto and/or streamed to generic wireless device 200. As a non-limiting example, the inmate profile can indicate that the inmate currently using generic wireless device 200 has access to a library of applications and content. The library can include applications and content that are specific to the inmate or that have been made available to all inmates of controlled environment 101. Based on settings saved by inmate and/or settings provided by administrators of controlled environment 101, certain applications and/or content can be loaded automatically by profile loader 251 for use by the inmate upon signing into the device. This allows the certain applications and/or content to be locally available. For example, the inmate can indicate that certain games and video conferencing software to be loaded onto generic wireless device 200 upon signing in. Administrators of controlled environment 101 can include administrative rules in the inmate profile that prevents applications and/or content from being stored on generic wireless device 200. A non-limiting example of one administrative rule can prevent the inmate or inmates from automatically loading movies onto their generic wireless devices. Such an administrative rule allows administrators to mandate that certain applications and/or content only be streamed from a database, such as generic provisioning server 106. In other words, administrative rules can control what can or cannot be locally stored on generic wireless device 200 and what can or cannot be remotely streamed to generic wireless device 200.

Content loader 252 cooperates with profile loader 251 to load and/or stream content from a database, such as generic provisioning server 106 based on the inmates profile and administrative rules associated with the inmate. In some embodiments, content loader 252 loads and/or streams content into generic workspace 254. In some embodiments, generic workspace 254 provides a graphical user interface for the inmate to access content identified in the inmate profile. Generic workspace 254 can be implemented as a designated partition of generic wireless device 200 that is made available (by, for example administrators of controlled environment 101) for access by an inmate. In implementation, generic workspace 254 can include designated memory portions in memory 230 in which inmate-related content can be stored. Generic wireless device 200 can include other designated partitions that are restricted from access by the inmate. These designated partitions may include files and or data that cannot be accessed and/or changed by inmates of controlled environment 101. Such files can include administrative files, device settings, and files associated with administrative functions of generic wireless device 200. These restricted partitions of generic wireless device 200 can include designated memory portions in memory 230 that are secured from access by any inmates. For example, administrators of controlled environment 101 can designated secure partitions in memory 230 that store data that are restricted from access such as the operating system and restricted settings of the device.

Generic workspace 254 represents an accessible partition of generic wireless device 200 and can be kept separate from other partitions of generic wireless device 200. Accordingly, inmate related data can be loaded into generic workspace 254 and made available for access by the inmate. In some embodiments, the inmate is only able to access the generic workspace 254 and the contents loaded thereon which maintains the security of the other partitions of generic wireless device 200. Segregating inmate related data into the generic workspace 254 also makes it easier to remove the inmate-related data because it is stored in a central location and specific designated memory portions of memory 230. In some embodiments, loading content into generic workspace 254 refers to storing the content into the designated portions of memory 230 and making the content accessible for use by the inmate such as through a graphical user interface provided by generic wireless device 200.

In some embodiments, content can include downloadable content and streamable content. Downloadable content refers to content that can be downloaded from generic provisioning server 106 and stored in memory 230 for the duration of the inmate's session with generic wireless device 200 (i.e., for as long as the inmate is signed into generic wireless device 200). Streamable content refers to content that can only be streamed from generic provisioning server 106 to generic wireless device 200 and is available for use by inmate but cannot be later accessed by the inmate even during the same session. A non-limiting example is a local movie that can be stored on generic wireless device (i.e., as local content) versus a remote movie that is to be streamed from generic provisioning server 106 (i.e., as remote content). The downloadable movie is downloaded in full to generic wireless device 200; the movie may appear as an icon or an accessible file on generic wireless device 200. In contrast, the streamable movie is streamed from generic provisioning server 106 to a temporary memory location (e.g., buffer 232) that is not accessible to inmate and is not stored in full on generic wireless device 200.

In some embodiments, both downloadable content and streamable content can appear as icons in generic workspace 254. For example, the inmate may select an icon associated with the downloadable content which can be either already stored locally on generic wireless device 200 or can be downloaded and temporarily stored in memory 230 of generic wireless device. Downloadable content can include but is not limited to media files such as movies, music, and images, applications, games, and communications. Additionally, the inmate may select another icon associated with the streamable content. In contrast to the downloadable content, the streamable content is stored at generic provisioning server 300 and is to be streamed to generic workspace 254. In some embodiments, streamable content can include content that is too large to be stored locally at generic wireless device 200 such as a movie.

As previously discussed, prior to signing in by an inmate, generic wireless device 200 is in a generic state and does not store any data and content associated with the inmate. After signing into generic wireless device 200, generic wireless device 200 is updated to an inmate-specific state; generic wireless device management system 100 determines the data and content associated with the inmate. In some embodiments, all inmate content is stored on generic provisioning server 106 and is streamed or transmitted to generic wireless device 200 as needed (e.g., by an inmate request). In some embodiments, some inmate content may be loaded automatically into generic workspace 254, such as upon signing into generic wireless device 200 by the inmate while other inmate content is stored remotely on generic provisioning server 106 which can later be streamed or transmitted as needed. All data and content, including downloadable and streamable content, is eventually removed from generic wireless device 200 and returned to its original generic state when the inmate signs out of generic wireless device (e.g., through manually signing out, the device entering a sleep mode after a predetermined period of inactivity or based on a predetermined schedule, or a signal from generic provisioning server to shut down).

In some embodiments, content loader 252 can temporarily install applications in generic workspace 254 of generic wireless device 200. For example, the inmate profile and/or administrative rules may indicate that inmate has privileges to locally access a game. Upon signing into generic wireless device 200, content loader 252 may receive the game from generic provisioning server 106 and temporarily install the game in generic workspace 254. Content loader 252 may then uninstall the game when the inmate signs out or shuts off generic wireless device 200.

Communication loader 253 retrieves and loads communications addressed to the inmate from a communications server, such as generic provisioning server 106, which tracks all generic wireless devices within controlled environment 101 and the inmates that are currently signed into each generic wireless device. Communications can include real-time communications such as voice data (e.g., phone calls) and video data (e.g., video conferencing calls), and non-real-time communications such as text data (e.g., SMS messages, emails) or voice mails. When generic provisioning server 106 receives an incoming communication addressed to an inmate, generic provisioning server 106 determines whether the inmate is currently signed into a generic wireless device 200. If the inmate is currently signed into a generic wireless device 200, generic provisioning server 106 coordinates with communication loader 253 to provide the incoming communication to the appropriate application for viewing or responding to the incoming communication.

Communication loader 253 can also load stored incoming messages. If the inmate is not currently signed into a generic wireless device 200, generic provisioning server 106 can determine whether the incoming communication is a real-time or non-real-time communication. If the incoming communication is a real-time communication, generic provisioning server 106 can route the caller to a voice mail application; generic provisioning server 106 can then store the voicemail in the inmate's profile. If the incoming communication is a non-real-time communication, generic provisioning server 106 can store the incoming communication in the inmate's profile. Once the inmate signs into a generic wireless device 200, any stored incoming communications and voicemails can be loaded into generic workspace 254 of generic wireless device 200.

Exemplary Generic Provisioning Server

Figure 3:
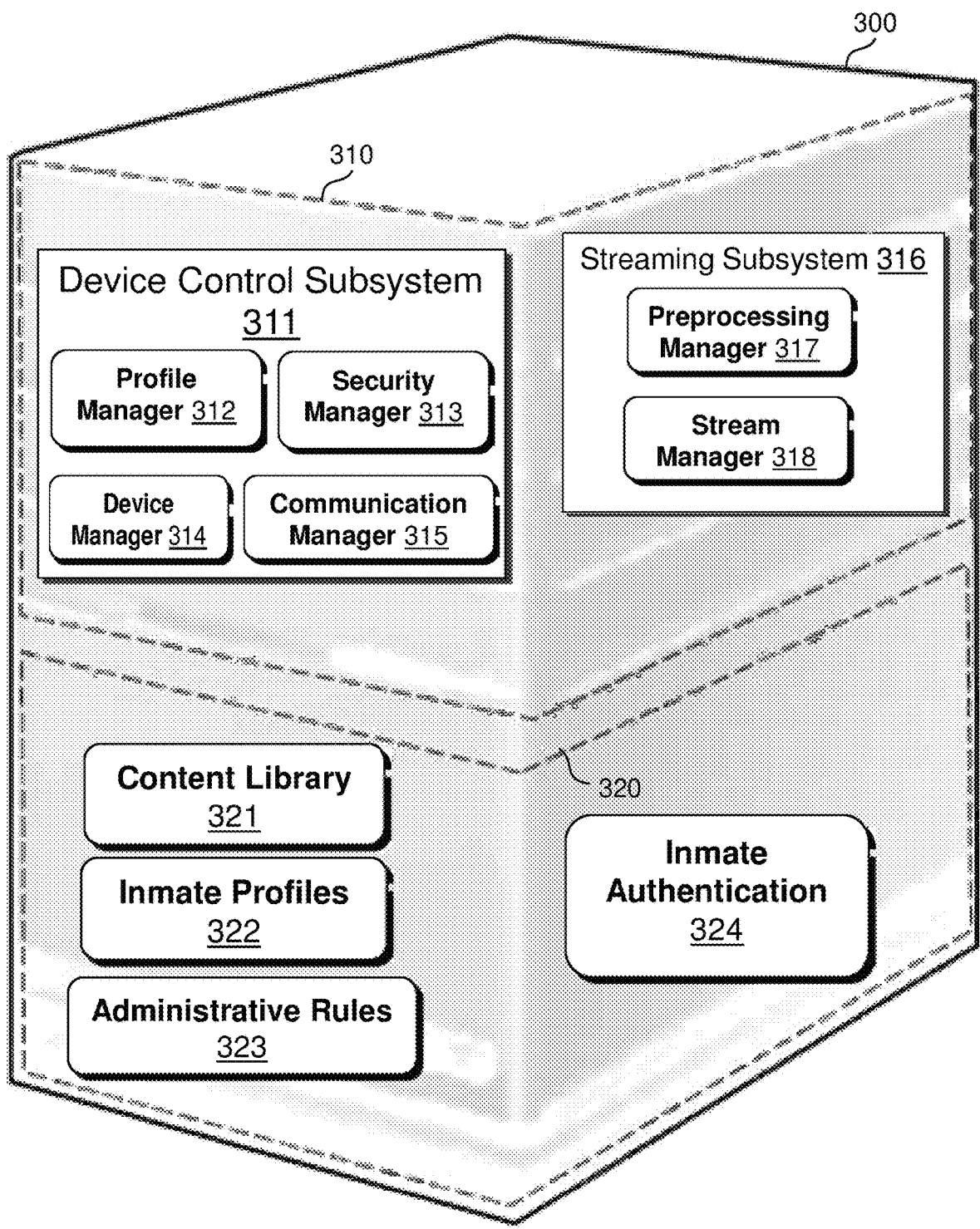
FIG. 3 illustrates an exemplary server system for use in the exemplary generic wireless device management system of FIG. 1, according to embodiments of the present disclosure.

FIG. 3 illustrates an exemplary generic provisioning server 300 for use in the exemplary generic wireless device management system 100 of FIG. 1, according to embodiments of the present disclosure. In some embodiments, generic provisioning server 300 represents an exemplary embodiment of generic provisioning server 106 of FIG. 1. Generic provisioning server 300 includes but is not limited to processing subsystem 310 and database 320. Processing subsystem 310 includes one or more processors, computers, or servers identified as subsystems and can be constructed as individual physical hardware devices, or as virtual devices, such as a virtual server. The number of processing subsystems can be scaled to match the number of simultaneous user connections desired to be supported by an inmate tracking system such as generic wireless device management system 100 of FIG. 1. Processors of processing subsystem 310 control the operation of device control subsystem 311 and streaming subsystem 316.

In some embodiments, device control subsystem 311 includes profile manager 312, security manager 313, device manager 314, and communication manager 315. Profile manager 312 controls and manages inmate profiles 322. Profile manager 312 receives and implements preferences from inmates regarding content to be loaded into generic workspace 254 and made available for access by the inmate. For example, inmate may provide a list of content that he wishes to be automatically loaded into generic workspace 254 and made available up on the inmate signing into a generic wireless device. Other preferences may include but are not limited to the inmate's personal allowed number (PAN) list. Profile manager 312 also can receive and implement administrative rules. Administrative rules can specify permissible or restricted actions that can be performed by the inmate or inmates of controlled environment 101. In this manner, administrative rules can be inmate-specific or global (i.e., apply to all inmates of controlled environment 101). For example, an inmate-specific administrative rule can be a white list regarding the inmate's PAN list or can specify allowable content that can be purchased by the inmate. As another example, a global administrative rule can be a black list that identifies telephone numbers that cannot be contacted by any inmate of controlled environment 101. Discussion of administrative rules are merely exemplary and other administrative rules are within the scope of the invention.

Additionally, administrative rules can specify permissible and/or restricted actions that apply to specific generic wireless devices, specific types of generic wireless devices (e.g., all tablets, all smart phones), or all generic wireless devices. For example, an administrative rule to a specific type of generic wireless device can be a restriction on certain content from being downloaded onto all generic smartphones.

Additionally, administrative rules can specify permissible and/or restricted actions that apply to specific content (e.g., a specific application can be banned), specific types of content (e.g., all video conference applications can be allowed or restricted based on a predetermined schedule), or all content (e.g., all content can be allowed or restricted based on a predetermined schedule).

Security manager 313 performs authentication functions when an inmate attempts to sign into generic wireless device 200. Security manager 313 receives authentication information of inmates. Authentication information includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate. Security manager 313 further facilitates a secure communication between generic wireless device 200 and generic provisioning server 300.

Device manager 314 performs tracking functions with regard to generic wireless devices in controlled environment 101. In some embodiments, device manager 314 tracks all generic wireless devices currently active in a network of controlled environment 101 as well as the inmates that have signed into each generic wireless device. For example, device manager 314 can associate the network information (e.g., IP address, MAC address, device identifier) of the generic wireless device with inmate information (e.g., inmate identifier, inmate user name).

Communication manager 315 performs functions related to incoming communications addressed to inmates of controlled environment 101 and outgoing communications transmitted by the inmates. Communication manager 315 receives incoming communications from parties outside of controlled environment 101 and determines the intended recipient of the incoming communications. Communication manager 315 can either load the incoming communication into generic workspace 254 if the inmate is signed in or store the incoming communication in the inmate profile associated with the intended recipient.

Communication manager 315 can also load stored incoming communications into generic workspace 254 that has been signed into by the inmate to whom the incoming communications are addressed. In other words, communication manager 315 determines that an inmate has signed into a generic wireless device and determines that the inmate has stored communications that should be loaded into generic workspace 254. For example, communication manager 315 may retrieve the stored communications from the inmate's profile. Communication manager 315 can also determine whether the incoming communication is a real-time or non-real-time communication. If the incoming communication is a real-time communication, communication manager 315 can route the person associated with the incoming communication to a voice mail application to leave a message for the inmate; communication manager 315 can then store the voicemail in the inmate's profile. If the incoming communication is a non-real-time communication, communication manager 315 can store the incoming communication in the inmate's profile.

In some embodiments, streaming subsystem 316 includes preprocessing manager 317 and stream manager 318. Streaming subsystem 316 performs streaming functions associated with content that can be streamed from generic provisioning server 300 to generic wireless devices.

Preprocessing manager 317 performs functions related to preprocessing content and/or applications on generic provisioning server 300 and streaming the results of the preprocessing to generic wireless device 200. In other words, content and/or applications that are eligible for preprocessing remain located on generic provisioning server 300 and do not need to be installed on generic wireless device 200. Such an implementation can reduce the processing requirements of the generic wireless device which in turn reduces the cost.

As one non-limiting example, generic provisioning server 300 can receive from generic wireless device 200 a request to launch a word processing application that is eligible for preprocessing by generic provisioning server 300. Instead of loading the word processing application (e.g., by transmitting it) into generic workspace 254, generic provisioning server 300 may load the game locally at generic provisioning server 300. Preprocessing manager 317 may then stream the output of preprocessing the word processing application, such as the graphics and sounds, from generic provisioning server 300 to generic wireless device 200. Preprocessing manager 317 allows the inmate to interact with the word processing application as if the word processing application were loaded locally on generic wireless device 200. The inmate can provide inputs, such as controls and commands, through generic wireless device 200, as if the word processing application were locally installed on generic wireless device 200. The inputs are transmitted to preprocessing manager 317 which processes the inputs and updates the word processing application.

Stream manager 318 performs functions related to streaming content from generic provisioning server 300 to generic wireless device 200. Stream manager 318 allows for content to be locally or remotely access through generic wireless device 200. Local access includes allowing streaming and storing content on generic wireless device 200 for the duration of the inmate's session with generic wireless device 200. In contrast, remote access includes allowing streaming and/or preprocessing content from generic provisioning server 300 to generic wireless device 200 but is not stored locally in a manner that can be later accessed by the inmate during his session. Content may be stored in a database, such as in content library 321 of database 320. As discussed above, certain content may be streamed to generic wireless device 200 automatically (e.g., upon signing in by the inmate), may be streamed on demand (e.g., upon a user request), or may be streamed after preprocessing by preprocessing manager 317. In some embodiments where all content of inmates is stored remotely at generic provisioning server 300, even after signing in by the inmate, stream manager 318 is responsible for streaming content to generic wireless device 200 on demand. Stream manager 318 coordinates with device control subsystem 311 and preprocessing manager 317 to provide content to generic wireless device 200 at the appropriate time as determined by the inmate's profile and the relevant administrative rules associated with the inmate, the generic wireless device, and/or the relevant content.

In some embodiments, database 320 includes content library 321, inmate profiles 322, administrative rules 323, and inmate authentication 324. Database 320 includes any number of databases and/or servers, and stores and organizes data in a relational database. Database 320 runs a database management system, such as MYSQL™, to provide an example.

Content library 321 stores all content available to inmates subject to inmate profiles, administrative rules, and any other conditions that may be attached to the specific content. Content library 321 can include content available for purchase by inmates, content previously purchased by inmates, and content associated with each inmate.

Inmate profiles 322 include inmate-specific information regarding the content associated with each inmate and subject to administrative rules associated with the inmate, the generic wireless device to which the inmate has signed in, and/or the specific content. In other words, inmate profiles 322 dictate the content in content library 321 to which each inmate may access from generic wireless device 200. For example, inmate profiles 322 identify all content that can be access by the inmate through generic wireless device 200 which includes content that has been purchased by the inmate, content that is available to be purchased by the inmate (as allowed or restricted by administrative rules), and multimedia specific to the inmate (e.g., photos, videos, music). Access to the content includes local access (e.g., when the content is temporarily stored and/or installed) and remote access (e.g., streaming or preprocessing by generic provisioning server 300).

Administrative rules 323 are allowances or restrictions on content usage provided by administrators of controlled environment 101. Administrative rules 323 allow administrators to control and manage how content is used by inmates. Administrative rules can be apply to inmates as an inmate specific rule or a global rule, to devices as a device specific rule, a device type rule, or a global rule, and to content as a content specific rule, a content type rule, and a global rule. Administrative inmate rules can be associated with an inmate (or inmates) and either allow or restrict access to content based on the identity of the inmate. Examples of administrative inmate rules include but are not limited to restricting or limiting the inmate's access to certain content, restricting or limiting the inmate's ability to use generic wireless device 200, and restricting or limiting the inmate's usage of the network (e.g., bandwidth).

Administrative device rules can be associated with a specific device, a type of device, or a group of devices, and either allow or restrict access to content based on the device or devices requesting the access. Examples of administrative device rules include but are not limited to restricting or limiting certain devices from accessing certain content, restricting or limiting certain types of devices from accessing certain content, and restricting or limiting devices' usage of the network.

Administrative content rules can be associated with a specific content, types of content, or all content in content library 321 and either allow or restrict access to content based on the content to which access is requested. Examples of administrative content rules include but are not limited to restricting or limiting the content that can be automatically downloaded onto generic wireless device, restricting or limiting the content that are eligible for preprocessing by generic provisioning server 300, and restricting or limiting usage of the network by certain types of content (e.g., limiting all video conference applications to a predetermined schedule).

Exemplary Generic Wireless Device Management System Operation

Exemplary usage of generic wireless device management system 100, generic wireless device 200, and generic provisioning server 300 in a controlled environment will be described with respect to FIGS. 4-7. The exemplary usage described in FIGS. 4-7 can be performed by processing logic that can comprise hardware (e.g., circuitry, dedicated logic, programmable logic, microcode, etc.), software (e.g., instructions executing on a processing device), or a combination thereof. For illustrative purposes, FIGS. 4-7 are described with respect to FIGS. 1-3 but are not limited to these example embodiments.

Figure 4:
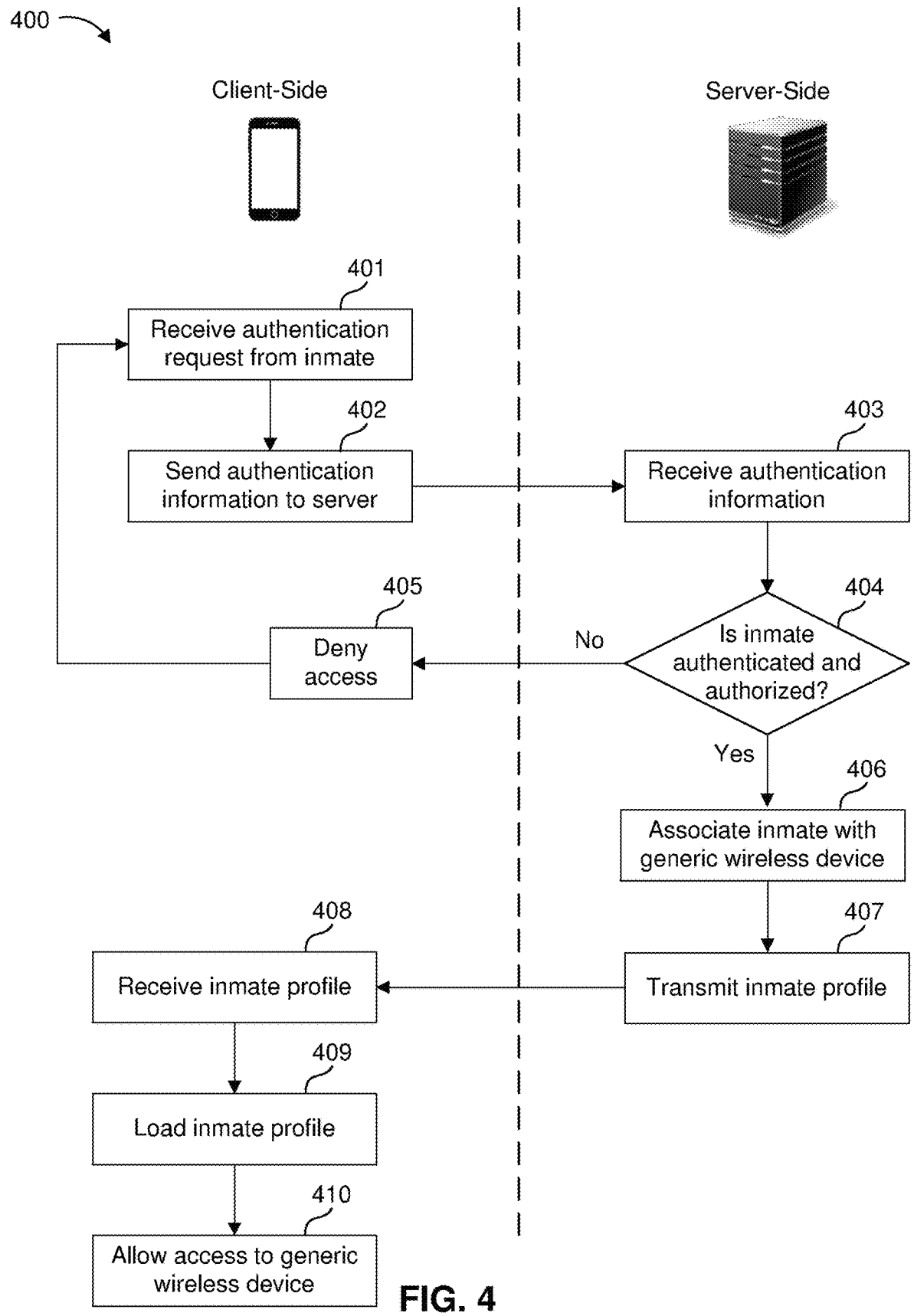
FIG. 4 illustrates a flowchart diagram of an exemplary method for providing access to an exemplary generic wireless device in the exemplary generic wireless device management system of FIG. 1, according to embodiments of the present disclosure.

FIG. 4 illustrates a flowchart diagram of an exemplary method 400 for providing access to an exemplary generic wireless device in the exemplary generic wireless device management system of FIG. 1, according to embodiments of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 4, as will be understood by a person of ordinary skill in the art. Some steps can be combined and performed as a single step. Method 400 can be performed by generic wireless device 200 and generic provisioning server 300.

In 401, an inmate attempts to sign into generic wireless device 200 which receives the inmate's authentication request. The authentication request includes but is not limited to a user name/password combination and/or biometric information from the user such as the inmate's fingerprint information, retinal information, facial information, and/or voice information. In 402, generic wireless device 200 transmits the authentication information included in the authentication request to generic provisioning server 300. In 403, generic provisioning server 300 receives the authentication information.

In 404, generic provisioning server 300 verifies the authentication information and determines, based on the verified authentication information, whether the inmate is authorized to access the network of controlled environment 101. If not, in 405, generic provisioning server transmits a signal to generic wireless device 200 to deny access. In 406, generic provisioning server 300 associates the inmate with generic wireless device 200. For example, generic provisioning server 300 links the inmate with identifying information of generic wireless device 200 such as a network addresses (e.g., internet protocol address, media access control address) and a device identifier. In this manner, generic provisioning server 300 tracks the inmate and usage of generic wireless device 200 and also is able to direct incoming communications addressed to the inmate to the appropriate generic wireless device.

In 407, if the inmate's identity is verified through the authentication information and the identified inmate is authorized, generic provisioning server 300 retrieves an inmate profile associated with the inmate. Generic provisioning server 300 then transmits the retrieved inmate profile to generic wireless device 200. In 408, generic wireless device 200 receives the transmitted inmate profile. At this point, generic wireless device 200 is still in a generic "blank" state and does not include any data associated with the inmate.

In 409, generic wireless device 200 loads the inmate profile into generic workspace 254. The inmate profile identifies settings and content associated with the inmate; generic wireless device 200 can be considered in an inmate-specific state. As previously discussed, the inmate profile indicates the content that is available to be accessed by the inmate through generic wireless device 200. In some embodiments, the inmate profile indicates content that is to be automatically downloaded onto generic wireless device 200. For example, loading the inmate profile into generic workspace 254 can include automatically downloading and installing a game within a designated partition in memory 230 if indicated by the inmate as a preference or setting in inmate profile (and if allowed by administrative rules). As another example, loading the inmate profile can further include downloading PAN lists, white lists, and black lists onto generic wireless device 200. In 410, the inmate may access generic wireless device 200 with the relevant settings and content now accessible for use by the inmate.

Figure 5:
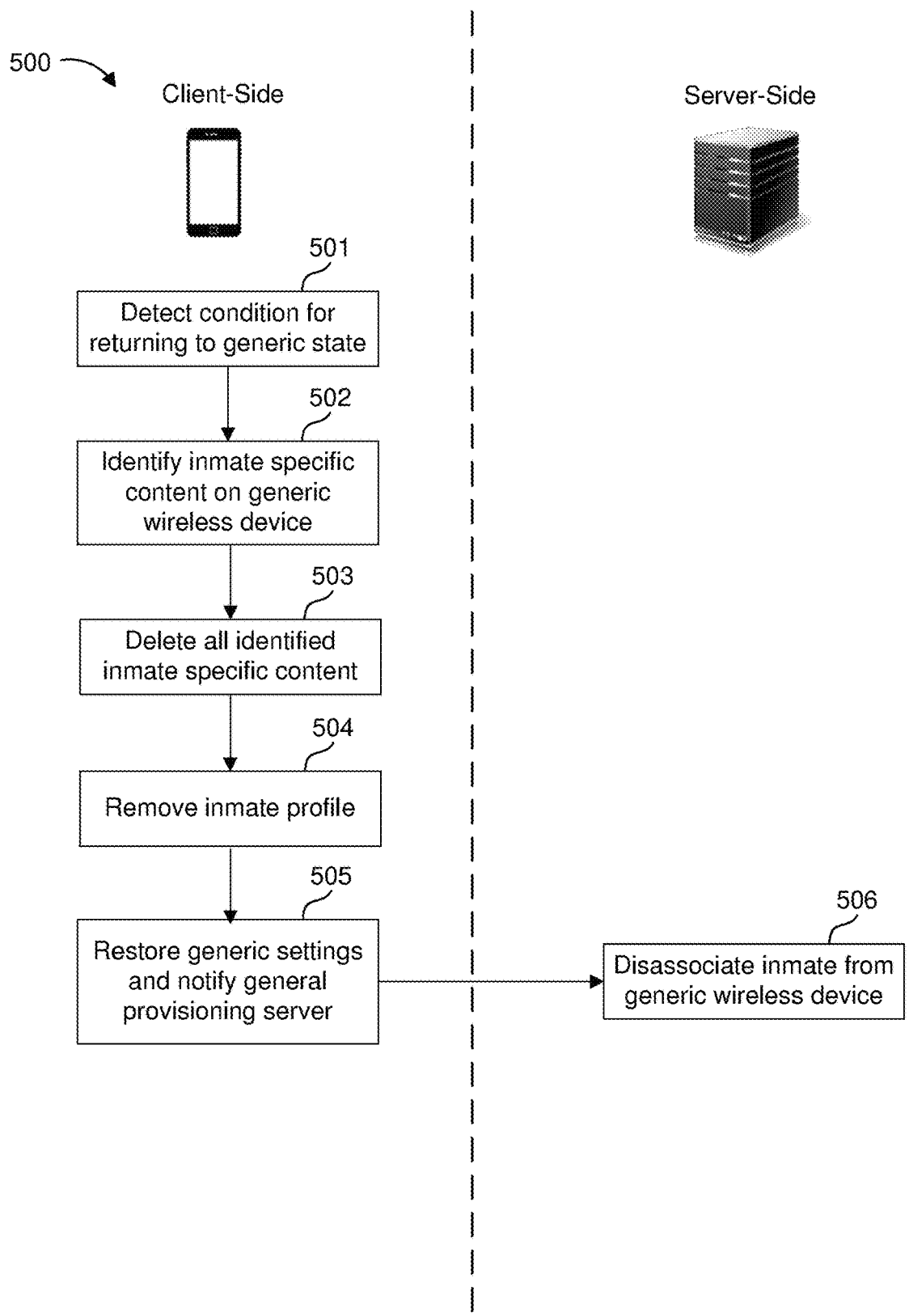
FIG. 5 illustrates a flowchart diagram of an exemplary method for removing content from an generic wireless device of FIG. 2, according to embodiments of the present disclosure.

FIG. 5 illustrates a flowchart diagram of an exemplary method 500 for removing content from generic wireless device, according to embodiments of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 5, as will be understood by a person of ordinary skill in the art. Some steps can be combined and performed as a single step. Method 500 can be performed by generic wireless device 200.

In 501, generic wireless device 200 detects a condition for returning to a generic state. The condition may include but is not limited to the inmate signing out of generic wireless device 200, a predetermined amount of idle time has passed since the inmate has used generic wireless device 200, the generic wireless device 200 is reset or shutdown, and a signal from generic provisioning server 300 to reset or shutdown generic wireless device 200.

In 502, generic wireless device 200 begins the process of returning to the generic state by identifying inmate-related content currently stored or installed on generic wireless device 200 such as in memory 230. Inmate-related content can include but is not limited to content that was automatically downloaded upon the inmate signing into generic wireless device 200, installed content such as applications or games, content that was downloaded upon request by the inmate after signing in, any streamed content, and any personal information associated with the inmate. In some embodiments, identifying inmate-related content includes identifying content loaded into generic workspace 254 and into designated portions of memory 230.

In 503, after identifying inmate-related content, generic wireless device 200 removes the identified inmate-related content from generic wireless device 200. In some embodiments, this includes erasing data from generic workspace 254 and memory 230. In 504, generic wireless device 200 also removes the inmate profile from generic workspace 254 which can include the inmate's preferences and settings. In 505, generic wireless device 200 then restores the generic settings by logging off the inmate. At this point generic wireless device 200 is returned to a generic state and generic workspace 254 is ready to load another inmate profile. Generic wireless device 200 also notifies generic provisioning server 300 that the inmate has signed out of the device. In 506, generic provisioning server 300 receives the notification from generic wireless device 200 and disassociates the inmate from generic wireless device 200. In some embodiments, disassociating the inmate includes disassociating an identifier associated with the inmate from device information associated with the generic wireless device 200, such as network addresses and device identifiers.

Figure 6:
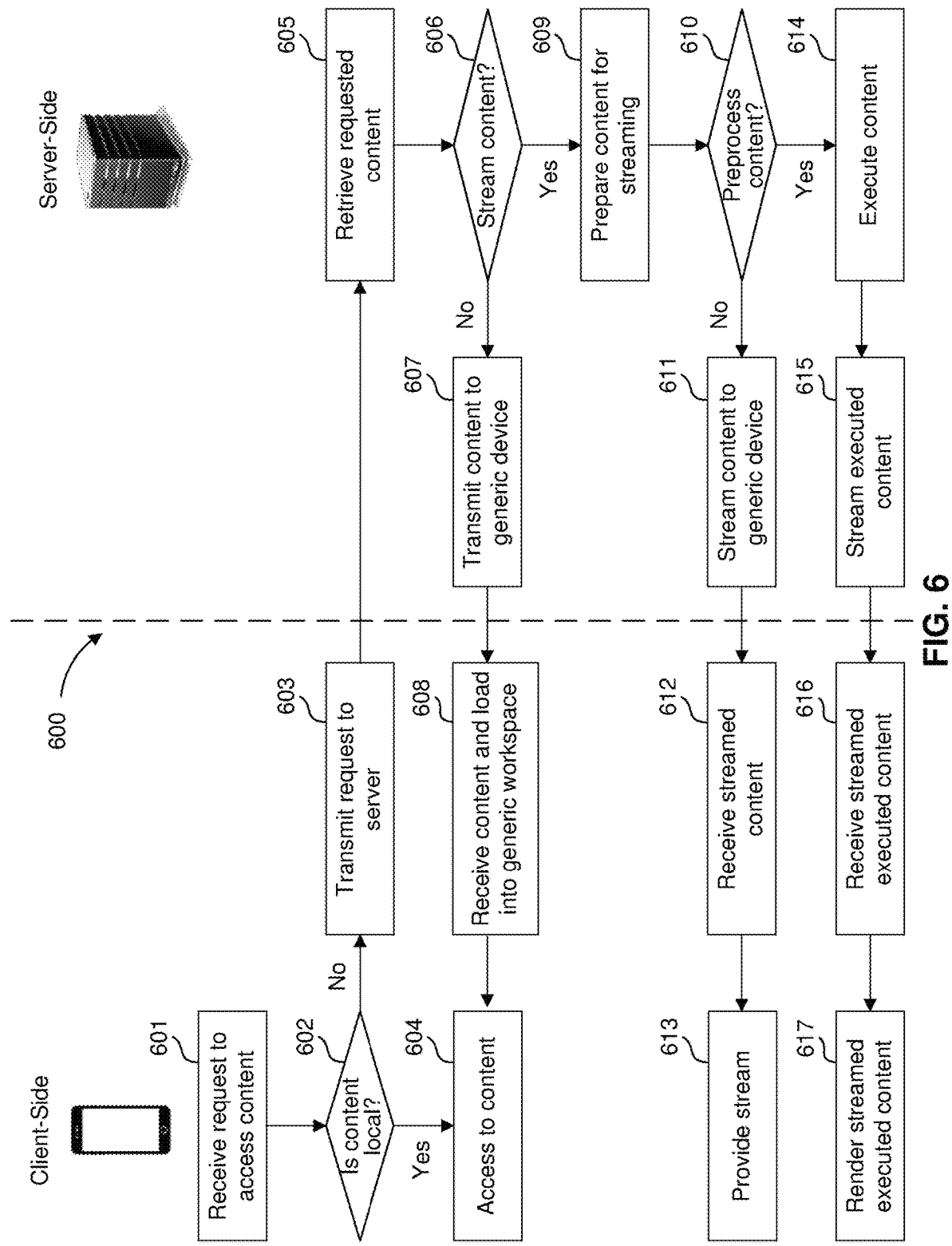
FIG. 6 illustrates a flowchart diagram of an exemplary method for accessing content within the exemplary generic wireless device management system of FIG. 1, according to embodiments of the present disclosure.

FIG. 6 illustrates a flowchart diagram of an exemplary method 600 for accessing content within the exemplary generic wireless device management system of FIG. 1, according to embodiments of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 6, as will be understood by a person of ordinary skill in the art. Some steps can be combined and performed as a single step. Method 600 can be performed by generic wireless device 200 and generic provisioning server 300.

In 601, generic wireless device 200 receives a request from the inmate to access content. In 602, generic wireless device 200 determines whether the requested content is already stored and locally available on generic wireless device 200. For example, the content could have been automatically downloaded after the inmate signed into generic wireless device 200. In 603, if it is determined that the content is not stored locally, generic wireless device 200 transmits a request for the content to generic provisioning server 300. In 604, if it is determined that the content is stored locally, generic wireless device 200 allows the inmate to access the content locally.

In 605, generic provisioning server 300 receives the request from generic wireless device 200 and retrieves the requested content which can be stored in content library 321 of database 320. In 606, generic provisioning server 300 determines if the requested content should be streamed to generic wireless device 200 or if it can be downloaded and stored locally in generic workspace 254. If 607, the requested content is determined to be downloaded onto generic wireless device 200. Generic provisioning server 300 can then transmit the requested content. In 608, generic wireless device 200 receives the content and loads the content into generic workspace 254 for access by the inmate. For example, if the content is a movie, generic wireless device 200 receives the movie and makes the movie available for selection in generic workspace 254.

In 609, the requested content is determined to be streamed to generic wireless device 200. Generic provisioning server 300 can then prepare the content to be streamed. In 610, generic provisioning server next determines whether the content can be preprocessed prior to streaming to generic wireless device 200. In 611, generic provisioning server 300 begins streaming the content. In 612, generic wireless device 200 receives the streamed content and begins buffering the content in a temporary memory location such as buffer 232. The inmate can use an application available in generic workspace 254 to access the content. For example, if the content is a streaming movie, generic workspace 254 provides a media player that allows the inmate to view the streamed movie. In 613, generic wireless device 200 provides the streamed content for access by the inmate.

In 614, the requested content is determined to be preprocessed prior to streaming. Generic provisioning server 300 executes the content. For example, if the content is a word processing application, generic provisioning server 300 opens the application on the server. In 615, generic provisioning server 300 begins streaming the executed content to generic wireless device 200. For example, generic provisioning server 300 streams the interface of the word processing application for viewing by generic wireless device 200. In 616, generic wireless device 200 receives the streamed executed content and, in 617, renders the streamed executed content for viewing and interaction by the inmate. Continuing the word processing application example, generic workspace 254 displays the word processing application and the inmate is able to interact with the application as if the application was installed on generic wireless device 200.

Figure 7:
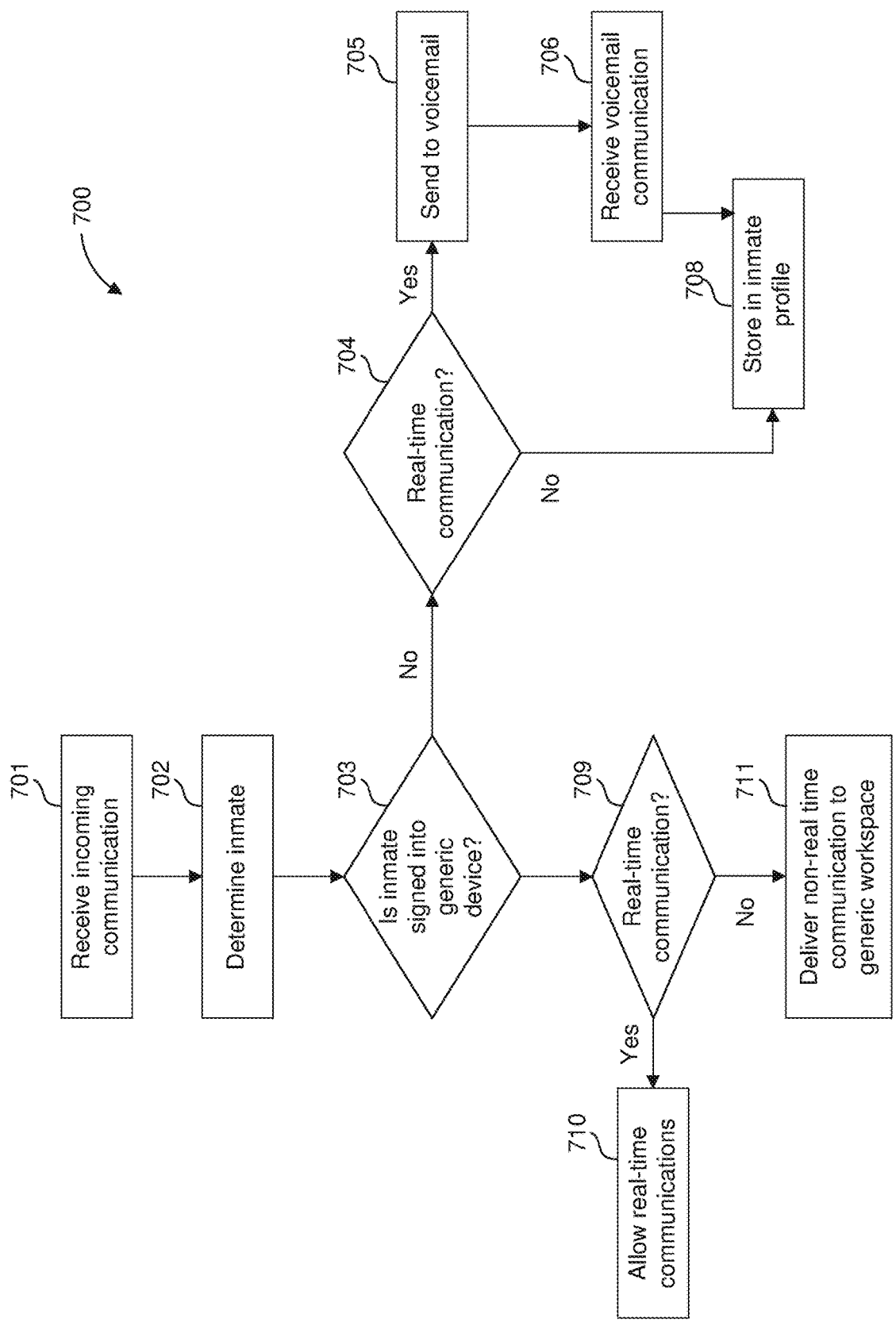
FIG. 7 illustrates a flowchart diagram of an exemplary method for routing communications within the exemplary generic wireless device management system of FIG. 1, according to embodiments of the present disclosure.

FIG. 7 illustrates a flowchart diagram of an exemplary method 700 for routing incoming communications within the exemplary generic wireless device management system of FIG. 1, according to embodiments of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 7, as will be understood by a person of ordinary skill in the art. Some steps can be combined and performed as a single step. Method 700 can be performed by generic provisioning server 300.

In 701, generic provisioning server 300 receives an incoming communication addressed to an inmate within controlled environment 101. In 702, generic provisioning server 300 parses the incoming communication and determines the inmate to whom the incoming communication is addressed. In 703, generic provisioning server 300 determines whether the inmate is currently signed into a generic wireless device. In 704, if the inmate is not currently signed into a generic wireless device, generic provisioning server 300 determines the incoming communication is a real-time communication such as a phone call or a video conference call. In 705, generic provisioning server 300 routes the caller to a voicemail application to allow the caller to leave a message for the inmate. In 706, the caller leaves a message which, in 708, is stored in the inmate's profile. If the incoming communication is a non-real-time communication, such as an email or an SMS message, generic provisioning server 300 stores the incoming communication in the inmate's profile in 708. When the inmate later signs into a generic wireless device, any stored messages in the inmate's profile can be loaded into the generic workspace for viewing by the inmate.

In 709, if the inmate is determined to be currently signed into a generic wireless device, generic provisioning server 300 next determines whether the incoming communication is a real-time communication. If yes, in 710, generic provisioning server 300 sends a signal to the generic wireless device associated with the inmate and permits the real-time communication by connecting the caller with the generic wireless device. If no, in 711, generic provisioning server 300 delivers the non-real-time communication to the generic workspace of the generic wireless device associated with the inmate. For example, if the non-real-time communication is an email or SMS message, generic provisioning server 300 delivers the email or SMS message to a corresponding application, such as an email or text messaging application, in the generic workspace for viewing by the inmate.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
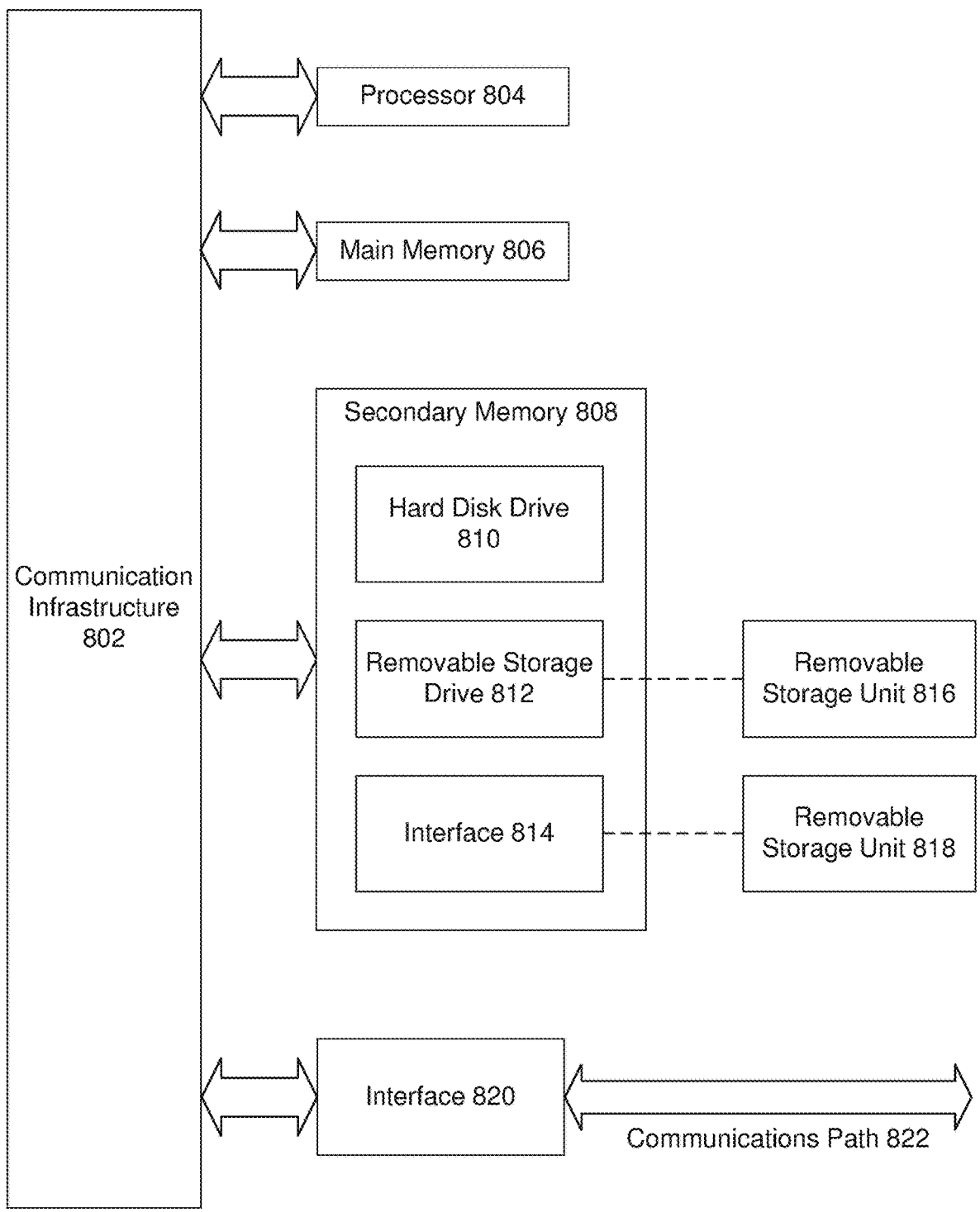
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for communicating with a generic wireless device in a controlled environment, the method comprising:
    receiving, by a generic provisioning server, a communication directed to a user currently located within the controlled environment;
    determining, by the generic provisioning server, whether the user is currently signed into the generic wireless device;
    transmitting, by the generic provisioning server, the communication to the generic wireless device, wherein the communication is configured to be loaded into a generic workspace of the generic wireless device responsive to determining that the user is currently signed into the generic wireless device, and wherein the communication comprises at least one of video data, audio data, an SMS message, or an email;
    storing the communication in a profile associated with the user responsive to determining that the user is not currently signed into the generic wireless device;
    performing, based on a request from the user, a sign-in process for authenticating the user, wherein the sign-in process comprises:
        authorizing, based on authentication information provided by the user, the user to sign into the generic wireless device;
        retrieving the profile associated with the user; and
        transmitting the profile to the generic wireless device, wherein the profile identifies settings and content associated with the user, the settings and the content configured to be loaded into the generic workplace of the generic wireless device.

2. The method of claim 1, further comprising:
receiving the request from the user to sign into the generic wireless device; and
transmitting, based on the sign-in process, the stored communication to the generic wireless device, wherein the stored communication is configured to be loaded into the generic workspace of the generic wireless device.

3. The method of claim 2, further comprising:
after receiving the request, retrieving additional stored communications that were received when the user was signed out of the generic wireless device; and
transmitting the additional stored communications to the generic wireless device, wherein the additional stored communications are configured to be loaded into the generic workspace of the generic wireless device.

4. The method of claim 2, wherein the profile indicates content to be automatically downloaded from the generic provisioning server to the generic wireless device, the method further comprising:
automatically transmitting, after transmitting the profile to the generic wireless device, the content to be loaded into the generic workspace of the generic wireless device.

5. The method of claim 1, further comprising:
determining whether the communication is a real-time communication or a non-real-time communication responsive to determining that the user is not currently signed into the generic wireless device;
routing a device associated with the communication to a voice mail application responsive to determining that the communication is the real-time communication;
receiving a voice mail from the device via the voice mail application; and
storing a second communication in a profile associated with the user.

6. The method of claim 5, further comprising:
storing the communication in a profile associated with the user responsive to determining that the communication is the non-real-time communication.

7. A generic provisioning server, comprising:
a memory; and
a processor coupled to the memory, the processor configured to:
receive a communication directed to a user currently located within a controlled environment, wherein the communication is transmitted by a device located outside of the controlled environment, and wherein the communication comprises at least one of video data, audio data, an SMS message, or an email;
determine whether the user is currently signed into a generic wireless device;
transmit the communication to the generic wireless device, wherein the communication is configured to be loaded into a generic workspace of the generic wireless device responsive to determining that the user is currently signed into the generic wireless device;
store the communication in a profile of the user responsive to determining that the user is not currently signed into the generic wireless device; and
perform, based on a request from the user, a sign-in process for authenticating the user, wherein in performing the sign-in process, the processor is further configured to:
authorize, based on authentication information provided by the user, the user to sign into the generic wireless device;
retrieve the profile associated with the user; and
transmit the profile to the generic wireless device, wherein the profile identifies settings and content associated with the user, the settings and the content configured to be loaded into the generic workplace of the generic wireless device.

8. The generic provisioning server of claim 7, the processor further configured to:
receive the request from the user to sign into the generic wireless device; and
transmit, based on the sign-in process, the stored communication to the generic wireless device, wherein the stored communication is configured to be loaded into the generic workspace of the generic wireless device.

9. The generic provisioning server of claim 8, the processor further configured to:
after receiving the request, retrieve additional stored communications that were received when the user was signed out of the generic wireless device; and
transmit the additional stored communications to the generic wireless device, wherein the additional stored communications are configured to be loaded into the generic workplace of the generic wireless device.

10. The generic provisioning server of claim 8, wherein the profile indicates content to be automatically downloaded from the generic provisioning server to the generic wireless device, the processor further configured to:
automatically transmit, after transmitting the profile to the generic wireless device, the content to be loaded into the generic workspace of the generic wireless device.

11. The generic provisioning server of claim 7, the processor further configured to:
determine whether the communication is a real-time communication or a non-real-time communication responsive to determining that the user is not currently signed into the generic wireless device;
route the device located outside of the controlled environment to a voice mail application responsive to determining that the communication is the real-time communication; and
receive a voice mail from the device via the voice mail application; and
store the voice mail in a profile associated with the user.

12. The generic provisioning server of claim 11, the processor further configured to:
store the communication in a profile associated with the user responsive to determining that the communication is the non-real-time communication.

13. A non-transitory computer-readable medium having instructions stored therein, which when executed by a processor in a generic provisioning server, cause the processor to perform operations, the operations comprising:
tracking, by the generic provisioning server, a plurality of generic wireless devices that are active within a network of a controlled environment, wherein the plurality of generic wireless devices include a generic wireless device;
receiving, by the generic provisioning server, a communication directed to a user currently located within the controlled environment, and wherein the communication comprises at least one of video data, audio data, an SMS message, or an email;

determining, by the generic provisioning server, whether the user is currently signed into the generic wireless device;

transmitting, by the generic provisioning server, the communication to the generic wireless device, wherein the communication is configured to be loaded into a generic workspace of the generic wireless device responsive to determining that the user is currently signed into the generic wireless device;

storing the communication in a profile of the user responsive to determining that the user is not currently signed into the generic wireless device; and performing, based on a request from the user, a sign-in process for authenticating the user, wherein the sign-in process comprises:

authorizing, based on authentication information provided by the user, the user to sign into the generic wireless device;

retrieving the profile associated with the user; and transmitting the profile to the generic wireless device, wherein the profile identifies settings and content associated with the user, the settings and the content configured to be loaded into the generic workplace of the generic wireless device.

14. The non-transitory computer-readable medium of claim 13, the operations further comprising:

receiving the request from the user to sign into the generic wireless device; and transmitting, based on the sign-in process, the stored communication to the generic wireless device, wherein the stored communication is configured to be loaded into the generic workspace of the generic wireless device.

15. The non-transitory computer-readable medium of claim 14, the operations further comprising:

after receiving the request, retrieving additional stored communications that were received when the user was signed out of the generic wireless device; and transmitting the additional stored communications to the generic wireless device, wherein the additional stored communications are configured to be loaded into the generic workplace of the generic wireless device.

\* \* \* \* \*

UNITED STATES PATENT AND TRADEMARK OFFICE
CERTIFICATE OF CORRECTION

| | |
|---|---|
| PATENT NO. | : 11,665,168 B2 |
| APPLICATION NO. | : 16/860457 |
| DATED | : May 30, 2023 |
| INVENTOR(S) | : Hodge |

It is certified that error appears in the above-identified patent and that said Letters Patent is hereby corrected as shown below:

On the Title Page

Column 1, Item (72), in "Inventor", Line 1, delete "Aubry," and insert -- Aubrey, --, therefor.

In the Specification

In Column 2, Line 11, delete "an" and insert -- a --, therefor.

In Column 3, Line 59, delete "In" and insert -- in --, therefor.

In Column 4, Line 63, delete "As" and insert -- as --, therefor.

In Column 5, Line 34, delete "an" and insert -- a --, therefor.

In the Claims

In Column 20, Claim 1, Line 55, after "device;" insert -- and --.

Signed and Sealed this
Twenty-second Day of August, 2023

*Katherine Kelly Vidal*

Katherine Kelly Vidal
*Director of the United States Patent and Trademark Office*